United States Patent [19]
Kneebone

[11] Patent Number: 5,768,733
[45] Date of Patent: Jun. 23, 1998

[54] RAMP SECURING DEVICE

[75] Inventor: Ken L. Kneebone, Neodesha, Kans.

[73] Assignee: Easy-Up Industries, Inc., Neodesha, Kans.

[21] Appl. No.: 597,814

[22] Filed: Feb. 7, 1996

[51] Int. Cl.$^6$ .............................. E01D 1/00; B65G 67/02
[52] U.S. Cl. ........................... 14/69.5; 414/537; D34/32; 224/572
[58] Field of Search .................................. 14/69.5, 71.1; 414/537; 296/61; 238/10 R; 224/402, 403, 572; D34/32

[56] References Cited

U.S. PATENT DOCUMENTS

| D. 291,619 | 8/1987 | Guillory | D34/32 |
|---|---|---|---|
| 843,835 | 3/1907 | McGinnis | 296/61 X |
| 1,139,240 | 5/1915 | Viche | 14/69.5 |
| 3,510,015 | 5/1970 | Roshaven | 296/61 |
| 3,511,393 | 5/1970 | Abromavage et al. | 414/537 |
| 3,516,560 | 6/1970 | Brighton | 14/69.5 |
| 3,737,058 | 6/1973 | Johnson | 414/537 |
| 4,290,728 | 9/1981 | Leduc | 414/537 |
| 4,700,421 | 10/1987 | Gladney et al. | D34/32 X |
| 4,727,612 | 3/1988 | Smith | 14/69.5 |
| 4,853,999 | 8/1989 | Smith | 14/69.5 |
| 4,979,867 | 12/1990 | Best | D34/32 X |
| 5,014,890 | 5/1991 | Perry | 224/403 |
| 5,096,362 | 3/1992 | Best | 414/537 |
| 5,277,436 | 1/1994 | Frank et al. | 14/69.5 |
| 5,325,558 | 7/1994 | LaBreche | 14/69.5 |
| 5,467,855 | 11/1995 | Sorensen | 414/537 X |
| 5,472,306 | 12/1995 | Stoll et al. | 414/537 |
| 5,538,308 | 7/1996 | Floe | 414/537 X |
| 5,540,474 | 7/1996 | Holland | 414/537 X |
| 5,608,937 | 3/1997 | Seigneur et al. | 14/69.5 |

OTHER PUBLICATIONS

Magliner Mobil–Dock, Magline Inc., Pinconning, Mich., 1968.
"Parts & Accessories" May 26, 1988, p. 223.
Universal Industrial Products Company ("UIP"), Inst-a–Ramp—The Complete Family, UIP Brochure, Form No. 1–94–20M (1994).
Northern Hydraulics Catalog, Inc., Summer Catalog #89, front and back coversheets and p. 121 (1995).
JC Whitney, Catalog No. 589J, front and back coversheets and pp. 106, 168 (1996).
Advertisement for Insta–Ramp Ramp Ends (Date Unknown).

Primary Examiner—James Lisehora
Attorney, Agent, or Firm—Hovey, Williams, Timmons & Collins

[57] ABSTRACT

A ramp assembly for spanning between a first lower surface and a second relatively elevated upper surface defined by a structure has an elongated runner that is supported in an inclined orientation, wherein the runner extends between the upper and lowers surfaces at an angle relative to the lower surface, by a support member attached to the runner and having a first portion thereof configured for engaging the upper surface. The assembly further includes an adjustable retainer for releasably securing the plank in its oblique orientation, wherein the retainer is connectable between the runner and the structure.

37 Claims, 1 Drawing Sheet

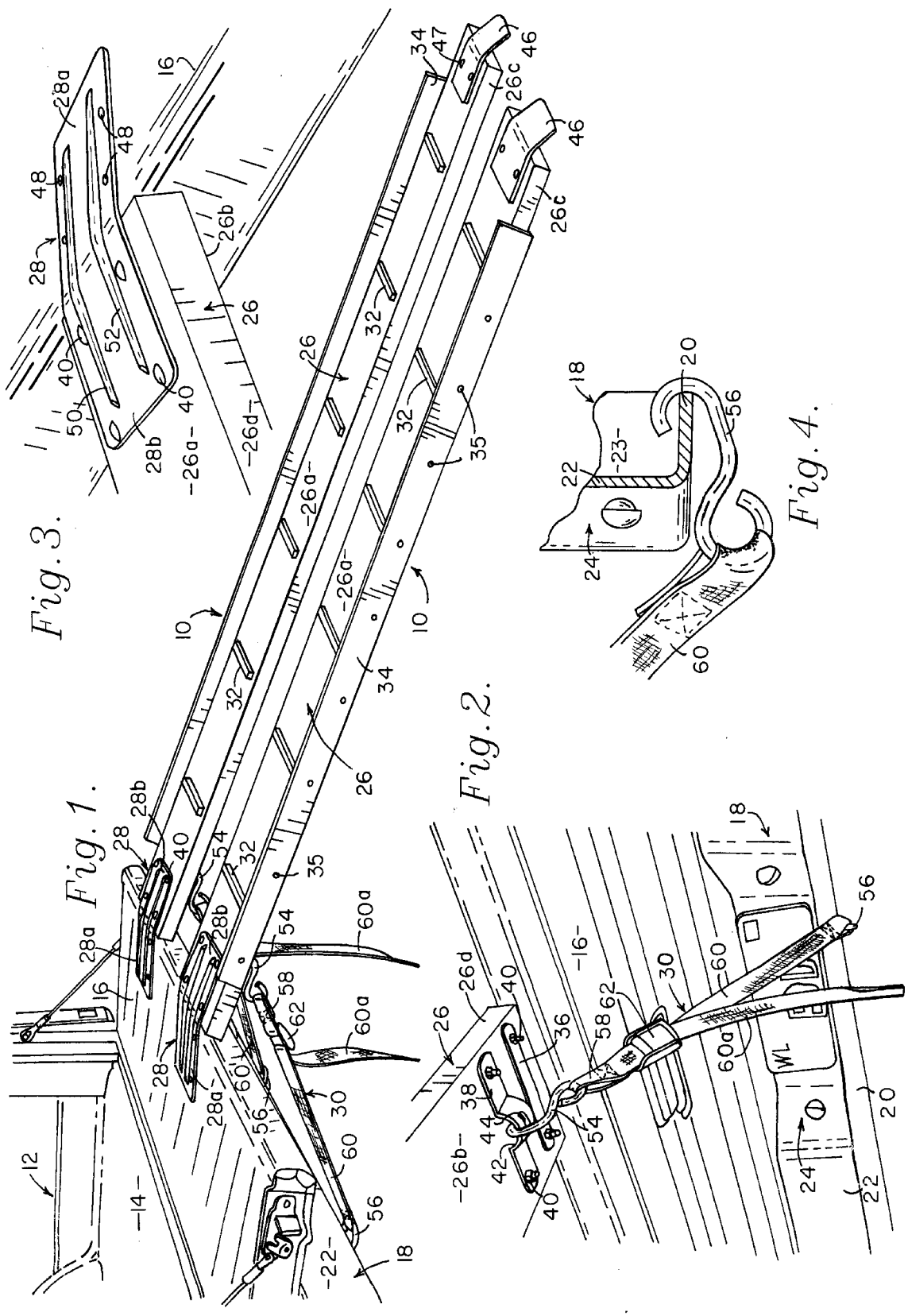

RAMP SECURING DEVICE

BACKGROUND OF THE INVENTION

1. Field of the Invention

The present invention relates generally to ramps for spanning between vertically spaced, upper and lower surfaces and, more particularly, to a device for securing a runner or plank in an inclined orientation, spanning between the surfaces, without having to nail, drill holes or otherwise permanently alter or damage the top surface.

2. Discussion of Prior Art

Ramps are routinely used to span between vertically spaced, upper and lower surfaces, such as the ground and a relatively elevated top surface of a structure, so as to provide easy access to and from the upper surface. Of course, ramps allow a person to slide or move an item along an inclined surface, rather than having to hoist or lift the item between the vertically spaced surfaces. Consequently, ramps are commonly used in construction sites so that materials, machinery and the like are relatively effortlessly raised and lowered between vertically spaced surfaces. Ramps are also often used to bypass stairs or provide wheelchair access between two vertically spaced surfaces. Moreover, ramps are becoming increasingly popular with pickup truck owners. In this respect, the ramp allows the pickup owner to load the bed of the truck with items, such as motorcycles and lawnmowers, with relative ease.

In any situation, it is important that the ramp be safe and sturdy so that persons are not injured while using the ramp. Traditionally, ramps are secured to the upper surface in a manner that prevents the ramp from disconnecting from the upper surface and falling to the lower surface. For example, the upper end of the ramp may be welded to the upper surface, nailed to the upper surface, or fastened to the upper surface by mechanical fasteners which extend through corresponding holes drilled in the ramp and surface. However, in many instances, the ramp must be removable so that it may be discarded or stowed away once access to the upper surface is no longer needed. Additionally, it is often important that the ramp be highly portable so that it may be manually maneuvered, installed and removed. Moreover, it is often desired, especially in instances where the ramp is secured to the tailgate of a pickup truck, to not permanently alter or damage the upper surface when the ramp is secured in its inclined orientation.

OBJECTS AND SUMMARY OF THE INVENTION

Responsive to these problems, an object of the present invention is to provide a ramp assembly for spanning between vertically spaced, upper and lower surfaces that is safe and sturdy, yet quickly removable and highly portable. Another object of the present invention is to provide a ramp assembly that is secured in its inclined orientation without damaging or permanently altering the upper surface. Yet another object of the present invention is to provide a conversion kit for converting an elongated runner, such as a wood plank, into a ramp that affords the provisions set forth hereinabove. Finally, it is an object of the present invention to provide a ramp assembly that is particularly suitable for securement to the tailgate of a pickup truck.

In accordance with these and other objects evident from the following description of a preferred embodiment of the invention, the invention provides a ramp assembly for spanning between a first lower surface and a second relatively elevated upper surface defined by a structure, which may be secured in an inclined orientation without damaging or permanently altering the upper surface. The ramp assembly includes an elongated runner, preferably formed of a wood plank, and a support member attached to the runner and having a first portion thereof configured for engaging the upper surface for supporting the runner in an inclined orientation, wherein the runner extends between the upper and lower surfaces at an angle relative to the lower surface. The assembly also includes an adjustable retainer for releasably securing the plank in its inclined orientation. The retainer is connectable between the runner and the structure.

Preferably, the retainer includes a first coupling element for releasably coupling with the runner, a second coupling element for releasably coupling with the structure, and an extendable and retractable member interconnecting the elements. The preferred coupling elements comprise hooks for releasably coupling with the structure and runner, wherein the hooks are formed of metal and coated with a vinyl material. The first coupling element, or hook, is coupled with the bottom face of the runner so that the top support face of the runner is unobstructed. Particularly, an anchor bracket is connected to the bottom face of the runner and configured for releasably coupling with the first hook. The preferred retainer includes a pair of flexible elongated straps, each coupled with one of the hooks. The member also includes a buckle assembly for releasably intercoupling the straps and selectively preventing relative longitudinal shifting of the straps when the hooks are coupled with the runner and the structure.

The preferred support member includes a second portion disposed at an angle relative to the first portion and connected to the top face of the runner. The support member may be formed of an elongated plate having the portions adjacent opposite ends thereof and a plurality of longitudinal strengthening ribs. Furthermore, the preferred support member is formed of metal and coated with a vinyl material so that the upper surface engaged by the support member is not scratched.

If desired, a plurality of transverse cleat members project from the top face of the runner at points spaced along the length thereof for enhancing traction along the runner. Additionally, at least one elongated side rail may be connected to the one or both side faces of the runner, whereby a portion of the rail projects outwardly beyond the top support face along the side thereof. If further desired, a pair of laterally spaced ramp assemblies may be supported on the upper surface so that the runners may be formed of relatively narrow planks, yet still provide an inclined surface wide enough to accommodate the laterally spaced apart wheels of a lawnmower or the like.

BRIEF DESCRIPTION OF THE DRAWING FIGURES

A preferred embodiment of the invention is described in detail below with reference to the attached drawing figures, wherein:

FIG. 1 is a perspective view of a ramp assembly constructed in accordance with the preferred embodiment of the invention, particularly illustrating the ramp assembly secured to the tailgate of a pickup truck;

FIG. 2 is an enlarged, fragmentary, perspective view taken from under the ramp assembly, particularly illustrating the adjustable retainer for securing the runner in an inclined orientation, wherein the retainer is connected between the bottom face of the runner and the rear bumper of the truck;

FIG. 3 is an enlarged fragmentary, perspective view of the of the upper end of the ramp assembly, particularly illustrating the support member attached to the top face of the runner and lying flatly upon the surface of the tailgate for supporting the runner in the inclined orientation; and FIG. 4 is an enlarged fragmentary, side elevational view of the rear bumper of the pickup, particularly illustrating a hook of the adjustable retainer removably coupled with the bumper.

DETAILED DESCRIPTION OF THE PREFERRED EMBODIMENT

Turning now to the drawings, and particularly FIG. 1, a pair of ramp assemblies, each being denoted by the numeral 10 and constructed in accordance with the principles of the present invention, are secured to a pickup truck 12 for spanning between a lower surface such as the ground and an upper surface in the form of the relatively elevated bed 14 of the truck. The pickup truck 12 forms no part of the present invention, per se, and therefore is not illustrated or described in detail herein. Suffice it to explain, the truck 12 includes a tailgate 16 attached to the rear end of the bed 14 and swingable between raised and lowered positions. In the lowered position, the tailgate 16 serves as an extension of the bed 14 to facilitate loading of the latter. The truck 12 further includes a rear, bumper 18 extending generally the width of the truck at the rear end thereof. As best shown in FIG. 4, the bumper 18 is substantially hollow and therefore presents a bottom wall 20, a rear wall 22 having a central, concave license display portion 24, a top wall (not shown), and end walls 23 (only one being illustrated) interconnecting the bottom, rear and top walls.

Returning to FIG. 1, each ramp assembly 10 generally includes an elongated runner 26 supported on the tailgate 16 in an inclined orientation by a support member 28 and secured in the inclined orientation by an adjustable retainer 30, which is connected between the runner 26 and pickup truck 12. Although the following detailed description will focus on the ramp assembly 10 spanning between the ground and the truck 12, it is within the ambit of the present invention to install the assembly 10 in other circumstances, such as between two levels of a structure that is under construction. Furthermore, it will be appreciated that the ramp assemblies 10 are nearly identical, and accordingly, only one of the assemblies will be described hereinbelow, although reference numerals and lead lines will be indicated on both assemblies.

The runner 26 preferably is formed of laminated lumber sold under the trademark "MICROLAM", although the use of other materials, such as metal, wood planks, or high-strength resinous material, is within the scope of the present invention. The preferred runner 26 has a rectangular cross-section and therefore presents a substantially flat top support face 26a, a bottom face 26b generally parallel to the top face 26a, and a pair of parallel side faces 26c,26d interconnecting the top and bottom faces.

As best shown in FIG. 1, a plurality of cleat members 32 are preferably spaced along the length of the top support face 26a for enhancing traction along the runner. In the illustrated embodiment, the cleat members 32 are attached to the top support face 26a by suitable means such as threaded screws (not shown), although it is entirely within the scope of the present invention to form the cleats integrally with the body of the runner 26. If desired, a side rail 34 may be attached to one or both of the side faces 26c,26d of the runner 26 for restricting lateral movement of an item moved along the support face 26a so that the item does not fall from the runner 26. The side rail 34 is also preferably attached to the side face, 26c or 26d, by threaded screws 35. Since a pair of ramp assemblies 10 are provided in the illustrated embodiment, side rails 34 are provided only along the outboard sides of the pair of assemblies. The side rails 34 are preferably formed of polypropylene for inhibiting cracking and weathering.

Turning to FIG. 2, the runner 26 further includes a transverse stress plate 36 and an inwardly spaced, transverse anchor bracket 38 which are attached to the runner adjacent the upper end of the bottom face 26b. The stress plate 36 and anchor bracket 38 are secured to the runner 26 by bolt assemblies 40, which extend through the runner 26 and also serve to secure the support member 28 to the top face 26a of the runner. As those of ordinary skill in the art will appreciate, the stress plate 36 serves to distribute the loads of the tightened bolt assemblies 40. The anchor bracket 38, on the other hand, not only serves to distribute the stress of the bolt assemblies 40, but also includes a central coupling ridge 42 having an elongated slot 44 therein, for purposes which will subsequently be described. Adjacent the other end of the runner 26, an angled base plate 46 (FIG. 1) is connected to the top face 26a of the runner by bolt assemblies 47. The base plate 46 angles downwardly from the top face 26a of the runner to the lower surface so that equipment (not shown) having relatively small wheels do not have to be lifted onto the end of the runner 26. Preferably, the stress plate 36, anchor bracket 38 and base plate 46 are formed of metal, with the stress plate 36 and anchor bracket 38 being zinc plated, while the base plate 46 is powder coated.

The preferred support member 28 is formed of metal and coated with a vinyl material, which is particularly useful since the support member 28 lies upon the tailgate 16 of the pickup and supports a significant portion of the load experienced by the ramp assembly 10 during use thereof. As best shown in FIG. 3, the preferred support member 28 is formed as a ramp bracket comprising an angled plate with an outboard portion 28a configured to lie generally flatly against the tailgate 16, and a relatively angled inboard portion 28b configured to lie flatly against the top face 26a of the runner 26 and, as previously indicated, secured to the top face 26a by bolt assemblies 40. As shown in FIG. 3, the outboard and inboard portions 28a and 28b, respectively, are integrally connected at a transverse bend to define an angle which is equal to the angle at which the runner 26 is disposed when the same is supported in its inclined orientation (assuming the ground and truck bed 14 are substantially parallel). With the inboard portion 28b lying flatly against the support face 26a of the runner 26, the support face is prevented from projecting beyond the bend for facilitating alignment of the runner and support member. If desired, the outboard portion 28a may include a plurality of bolt or nail holes 48 cut therein to allow attachment to the tailgate 16, although such attachment is unnecessary with the present invention. The support member 28 is preferably provided with a pair of longitudinal strengthening ribs 50,52. As shown in FIG. 3, the ribs 50,52 extend across the bend and into each of the portions 28a,28b of the support member. The illustrated ribs 50,52 project from the top surface of the support member 28 so that the bottom surface of each of the support member portions 28a,28b is substantially flat. The ribs 50,52 are also substantially parallel and sufficiently spaced apart to define a flat open area therebetween on the top surface of each of the support member portions 28a,28b. The ends of the ribs 50,52 are disconnected so that the open area extends the entire length of the ribs. It will be appreciated that ramps have been provided with similar support members in the past. However, it is necessary to fasten conventional support members to the tailgate 16, such as with nails or bolt assemblies, or the member has a tendency to disengage the tailgate and allow the runner to fall to the ground during use of the ramp. With the present invention, on the other hand, the outboard portion 28a of the support member 28 may simply be placed in supporting engagement with the tailgate 16 (i.e., with no means for securing the portion 28a thereto), while the retainer 30 prevents the ramp assembly 10 from falling off the tailgate 16.

In the preferred embodiment, the retainer 30 consists of a tie down strap including first and second S-shaped hooks 54 and 56, first and second flexible nylon straps 58 and 60 respectively connected to first and second hooks 54 and 56, and a buckle assembly 62 releasably intercoupling the straps 58,60. The first hook 54 is configured to loop around the coupling ridge 42 of the anchor bracket 38, with the end of the hook projecting through the slot 44 defined in the ridge 42. The second hook 56, on the other hand, is configured for coupling with the truck 12 and is preferably hooked around the bottom wall 20 of the truck bumper 18. The hooks 54,56 are preferably formed of metal and coated with a vinyl material so as to prevent scratching of the truck bumper 18. As well understood in the art, the buckle assembly 62 selectively prevents relative longitudinal shifting of the flexible straps 58,60 when the hooks 54,56 are installed, thereby allowing the user to tighten and loosen the tie down strap 30. In the illustrated embodiment, the second strap 60 presents a freely hanging segment 60a which is selectively pinched by the buckle assembly 62 for preventing relative movement therebetween. The free segment 60a may also be grasped and pulled by the user for tightening the tie down strap 30. A tie down strap 30 constructed in accordance with the present invention and well suited for most applications is available from Yeu Yueh of Taichung 40115, Taiwan R.O.C. as part No. Y-304. Although the first and second hooks 54 and 56 and first and second straps 58 and 60 are hereinabove matched with runner 26 and truck 12, respectively, it is well understood that the same are relatively interchangeable and may be coupled with either the truck or runner.

It is entirely within the scope of the present invention to utilize retainers other than the illustrated tie down strap 30. For example, a retainer may be employed that includes a pair of flexible straps configured for looping around the truck bumper 18 and anchor bracket 38 and a pair of ratchet-type buckles intercoupling the straps, thereby eliminating the hooks 54,56. Alternatively, a turnbuckle pivotally coupled with the hooks 54,56 may be employed, rather than the flexible straps 58,60 and buckle assembly 62 described above.

In use, the outboard portion 28a of the support member 28 is placed upon tailgate 16 so that it lies generally flatly against the latter, whereby the runner 26 is supported in an inclined orientation. The user urges the runner 26 toward the truck 12 to ensure that the upper end of the runner 26 abuttingly engages the edge of the tailgate 16, as shown in FIG. 3. The hook members 54 and 56 are then coupled with the anchor bracket 38 and bottom wall 20 of the bumper 18, respectively. Finally, the user grasps and pulls the free segment 60a of the second strap 60 until the tie down strap 30 is sufficiently taut to prevent the support member 28 from shifting off the tailgate 16, thereby securing the runner in its inclined orientation.

It will be appreciated that the principles of the present invention are also applicable toward a conversion kit for converting a runner, such as wooden plank, into a ramp for spanning between vertically spaced upper and lower surfaces. The preferred conversion kit comprises the support member 28, tie down strap 30, stress plate 36, anchor bracket 38, and bolt assemblies 40. In addition, the kit may include base plate 46, cleat members 32, side rail 34, and a plurality of threaded screws 35. As apparent from the foregoing, holes (not shown) are drilled in the runner 26 for reception of the bolt assemblies 40,47. The support member 28, stress plate 36, anchor bracket 38 and base plate 46 are subsequently secured to the runner 26 by the respective bolt assemblies 40 and 47. The cleat members 32 are attached to the top face 26a of the runner 26 at points spaced along the length thereof by threaded screws (not shown). Similarly, the side rail 34 is attached to one or both sides 26c,26d of the runner by the threaded screws 35.

Numerous advantages are realized with the preferred embodiment of the present invention. For example, the present invention affords a ramp assembly 10 which may be secured in an inclined orientation spanning between vertically spaced, upper and lower surfaces, without having to damage or permanently alter the upper surface, such as the tailgate 16 of a pickup truck 12. Furthermore, the preferred retainer 30 for securing the runner 26 in its inclined orientation extends downwardly from the bottom face 26b of the runner so as to prevent interference with items moving along the top support face 26a of the runner. Additionally, the retainer 30 assuredly secures the runner 26 in its inclined orientation, while allowing simple and quick removal from the truck 12. If desired, the ramp assembly 10 may be constructed of relatively lightweight materials to enhance maneuverability and portability thereof.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, if the truck 12 does not include the tailgate 16, the support member 28 may be placed directly on the bed 14. Moreover, the ramp assembly 10 may be employed in a variety of other situations. If desired, the ramp assembly 10 may be used to span between a lower surface and a relatively elevated upper surface defined by a structure under construction, in which case the support member 28 is placed upon the upper surface and the second hook 56 is configured for hooking around a portion of the structure, such as a stud (not shown) or other structural member, or an eye-bolt temporarily placed in the structure. It is also within the ambit of the present invention to form the runner of a synthetic material, in which case it is possible to form the support member 28, cleat members 32, side rail 34, anchor plate 38, and base plate 46 integrally with the runner.

The inventor hereby states his intent to rely on the Doctrine of Equivalents to determine and assess the reasonably fair scope of the present invention as pertains to any apparatus not materially departing from but outside the literal scope of the invention as set out in the following claims.

What is claimed is:

1. A ramp assembly for spanning between a first lower surface and a second relatively elevated upper surface defined by a structure, comprising:

an elongated runner;

a support member attached to the runner and having a first portion thereof configured for engaging the upper surface for supporting the runner in an inclined orientation, wherein the runner extends between the upper and lower surfaces at an angle relative to the lower surface; and an adjustable retainer for releasably securing the runner in its inclined orientation, said retainer being connectable between the runner and the structure, said retainer including a first coupling element for releasably coupling with the runner, a second coupling element for releasably coupling with the structure, and an extendable and retractable member interconnecting the elements.

2. A ramp assembly as claimed in claim 1, said runner having a substantially flat, top support face, said runner including a plurality of transverse cleat members projecting from the top face of the runner at points spaced along the length thereof for enhancing traction along the runner.

3. A ramp assembly as claimed in claim 2, said runner including at least one elongated side rail projecting outwardly beyond the top support face and extending along the length thereof.

4. A ramp assembly as claimed in claim 3, said runner having a pair of side faces depending from opposed sides of the top face, said at least one side rail being a rectangular panel which is connected to one of the side faces of the runner.

5. A ramp assembly as claimed in claim 1, said runner being formed of wood.

6. A ramp assembly as claimed in claim 1, said support member including a second portion disposed at an angle relative to the first portion, said second portion being connected to the top face of the runner.

7. A ramp assembly as claimed in claim 6, said support member being an elongated plate having said portions adjacent opposed ends thereof, said plate including a plurality of longitudinal strengthening ribs.

8. A ramp assembly as claimed in claim 7, said plate being formed of metal and coated with a vinyl material.

9. A ramp assembly as claimed in claim 1, said runner having a substantially flat, top support face and a generally parallel bottom face, said first coupling element being coupled with the runner along the bottom face thereof.

10. A ramp assembly as claimed in claim 9, said elements including hooks for releasably coupling with the structure and runner.

11. A ramp assembly as claimed in claim 10, said hooks being formed of metal and coated with a vinyl material.

12. A ramp assembly as claimed in claim 11, said runner having a substantially flat, top support face and a generally parallel bottom face, said runner including an anchor bracket projecting from the bottom face thereof, which is configured for releasably coupling with said first hook.

13. A ramp assembly as claimed in claim 10, said member including a pair of flexible elongated straps, each coupled with one of the hooks, and a buckle assembly releasably intercoupling the straps and selectively preventing relative longitudinal shifting of the straps when the hooks are coupled with the runner and the structure.

14. A ramp assembly as claimed in claim 13, said support member including a second portion disposed at an angle relative to the first portion, said second portion being connected to the top face of the runner.

15. A ramp assembly as claimed in claim 14, said hooks and said support member being formed of metal and coated with a vinyl material.

16. A conversion kit for converting an elongated runner, having a substantially flat, top support face and a bottom face, into a ramp for spanning between a first lower surface and a second relatively elevated upper surface defined by a structure, said kit comprising:

a support member configured for attachment to the runner and having a first portion thereof configured for engaging the upper surface for supporting the runner in an inclined orientation, wherein the runner extends between the upper and lower surfaces at an angle relative to the lower surface, and an adjustable retainer for releasably securing the runner in its inclined orientation, said retainer being connectable between the runner and the structure, said retainer including a first coupling element for releasably coupling with the runner, a second coupling element for releasably coupling with the structure, and an extendable and retractable member interconnecting the elements.

17. A conversion kit as claimed in claim 16; and a plurality of cleat members configured for attachment to the top face of the runner at points spaced along the length thereof for enhancing traction along the runner.

18. A conversion kit as claimed in claim 17; and at least one elongated side rail configured for projecting outwardly beyond the top support face along one of the sides thereof when the rail is attached to the runner along the length thereof.

19. A conversion kit as claimed in claim 16, said support member including a second portion disposed at an angle relative to the first portion, said second portion being configured for connection to the top face of the runner.

20. A conversion kit as claimed in claim 19, said support member being an elongated plate with said portions adjacent opposed ends thereof, said plate including a plurality of longitudinal strengthening ribs.

21. A conversion kit as claimed in claim 20, said plate being formed of metal and coated with a vinyl material.

22. A conversion kit as claimed in claim 16, said elements including hooks for releasably coupling with the structure and runner.

23. A conversion kit as claimed in claim 22, said hooks being formed of metal and coated with a vinyl material.

24. A conversion kit as claimed in claim 23; and an anchor bracket configured for attachment with the bottom face of the runner and for releasably coupling with said first hook.

25. A conversion kit as claimed in claim 22, said member including a pair of flexible elongated straps, each coupled with one of the hooks, and a buckle assembly releasably intercoupling the straps and selectively preventing relative longitudinal shifting of the straps when the hooks are coupled with the runner and the structure.

26. A conversion kit as claimed in claim 25, said support member including a second portion disposed at an angle relative to the first portion, said second portion being configured for connection to the top face of the runner.

27. In a conversion kit as claimed in claim 26, said hooks and said support member being formed of metal and coated with a vinyl material.

28. A ramp assembly for spanning between a first lower surface and a second relatively elevated upper surface defined by a structure, said assembly comprising:

an elongated runner having a substantially flat, top support face and a bottom face;

a support member attached to the runner and having a first portion thereof configured for engaging the upper surface for supporting the runner in an inclined orientation, wherein the runner extends between the upper and lower surfaces at an angle relative to the lower surface;

an anchor bracket attached to the runner and having a coupling portion spaced below the bottom face of the runner when the runner is in its inclined orientation, said coupling portion being configured for releasably anchoring to the structure for securing the runner in its inclined orientation; and an adjustable retainer connectable between the coupling portion and the structure for anchoring the bracket to the structure and thereby securing the runner in its inclined orientation, said retainer including a first coupling element releasably coupled to the coupling portion of the bracket, a second coupling element for releasably coupling to the structure, and an extendable and retractable member interconnecting the elements.

29. A ramp assembly as claimed in claim 28, said first coupling element comprising a hook removably looped around the coupling portion.

30. A ramp assembly as claimed in claim 29, said bracket including an attachment portion projecting from the coupling portion, said attachment portion lying against the bottom face of the runner.

31. A ramp assembly as claimed in claim 30, said support member including a second portion disposed at an angle relative to the first portion, said second portion being connected to the top face of the runner.

32. A ramp assembly as claimed in claim 31; and fastening means for clamping the runner between the attachment portion of the bracket and the second portion of the support member.

33. A conversion kit for converting an elongated runner, having a substantially flat, top support face and a bottom face, into a ramp for spanning between a first lower surface and a second relatively elevated upper surface defined by a structure, said kit comprising:

a support member configured for attachment to the runner and having a first portion thereof configured for engaging the upper surface for supporting the runner in an inclined orientation, wherein the runner extends between the upper and lower surfaces at an angle relative to the lower surface;

an anchor bracket attached to the runner and having a coupling portion spaced below the bottom face of the runner when the runner is in its inclined orientation, said coupling portion being configured for releasably anchoring to the structure for securing the runner in its inclined orientation; and an adjustable retainer connectable between the coupling portion and the structure for anchoring the bracket to the structure and thereby securing the runner in its inclined orientation, said retainer including a first coupling element releasably coupled to the coupling portion of the bracket, a second coupling element for releasably coupling to the structure, and an extendable and retractable member interconnecting the elements.

34. A conversion kit as claimed in claim 33, said first coupling element comprising a hook removably looped around the coupling portion.

35. A conversion kit as claimed in claim 34, said bracket including an attachment portion projecting from the coupling portion, said attachment portion lying against the bottom face of the runner.

36. A conversion kit as claimed in claim 35, said support member including a second portion disposed at an angle relative to the first portion, said second portion being configured for connection to the top face of the runner.

37. A conversion kit as claimed in claim 36; and fastening means for clamping the runner between the attachment portion of the bracket and the second portion of the support member.

\* \* \* \* \*